Figure 1:
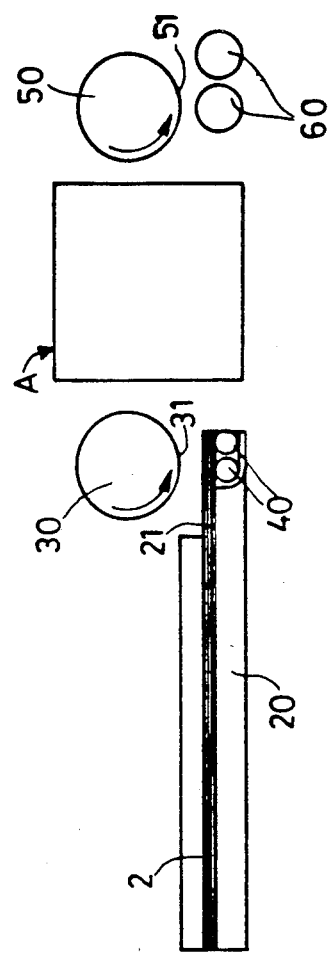

United States Patent [19]

Cassou et al.

[11] Patent Number: 4,790,451
[45] Date of Patent: Dec. 13, 1988

[54] APPARATUS FOR DISPENSING CYLINDRICAL CAPSULES

[76] Inventors: Robert Cassou; Maurice Cassou, both of Rue Clémenceau; Bertrand Cassou, Saint Symphorien des Bruyeres, all of, 61000 L'Aigle, France

[21] Appl. No.: 4,894
[22] Filed: Jan. 20, 1987

[30] Foreign Application Priority Data

Jan. 27, 1986 [FR] France .................... 86 01094

[51] Int. Cl.⁴ .......................................... B65G 59/06
[52] U.S. Cl. ......................... 221/233; 221/236; 414/276
[58] Field of Search ............... 221/164, 179, 181, 236, 221/237, 233, 254; 414/748, 276

[56] References Cited

U.S. PATENT DOCUMENTS

| | | |
|---|---|---|
| 2,167,049 | 7/1939 | Maurath et al. ............... 221/237 X |
| 2,935,227 | 5/1960 | Swartz ............................... 221/179 |
| 2,997,725 | 8/1961 | Friedman ...................... 221/254 X |
| 3,039,384 | 6/1962 | Kingsley . | 
| 3,774,779 | 11/1973 | White ................................. 414/748 |
| 4,567,997 | 2/1986 | Portyansky .................... 221/236 X |
| 4,713,563 | 1/1973 | Dickensheets et al. . |

FOREIGN PATENT DOCUMENTS

| | | |
|---|---|---|
| 738828 | 10/1943 | Fed. Rep. of Germany . |
| 2251503 | 6/1975 | France . |
| 56120428 | 4/1983 | Japan . |
| 1372722 | 11/1974 | United Kingdom . |

*Primary Examiner*—F. J. Bartuska
*Attorney, Agent, or Firm*—Bachman & LaPointe

[57] ABSTRACT

A dispenser for dispensing and conveying capsules to a printer for receiving indicia comprises a sloping ramp and a complementary guide which define a conveying passageway having an inlet and an outlet. A vertically movable slide member is associated with the outlet and is movable between a first position wherein the slide member receives a capsule from the outlet of the conveying passageway and a second position wherein a portion of the slide member seals the outlet of the conveying passageway. The slide member when in its second position further defines with the complementary guide a horizontally extending passageway for conveying the capsule to the printer.

7 Claims, 1 Drawing Sheet

APPARATUS FOR DISPENSING CYLINDRICAL CAPSULES

The invention relates to a dispenser for cylindrical capsules, which is intended for advancing capsules supplied to it, arranged parallel and side by side, in a longitudinal translational movement and end to end.

This device is designed particularly to be associated with an ink-jet printing unit serving, for example, to print identifying inscriptions on the periphery of the capsules.

In fact, in order to print inscriptions on capsules, ink-jet printing units require a uniform advance of these capsules along a straight path at a constant speed and without vibration, with a repetition time governed by the particular printing conditions.

In the embodiment described and illustrated, the capsules are tubes intended for the packaging of various biological liquids and designed for the storage, preservation and numerous uses of these liquids and are made of food-compatible rigid polyvinyl chloride of "crystal" appearance, but the invention is not limited to such capsules; the capsules under consideration here have a length of 133 mm and are available in three different diameters which respectively define volumes of 0.25 $cm^3$, 0.50 $cm^3$ and 1.00 $cm^3$. At one end, the tubes have a porous composite plug capable of automatically closing off this end in contact with an aqueous liquid, and at the same time being converted into a leak-proof elastic gel; the other end is sealed, after filling, by means of various known processes, making it possible to obtain an absolutely leak-proof packaging impervious to most bacteria.

The packaging of highly varied substances in these capsules implies the need to make it possible easily to identify the substance contained in a particular capsule. Examples of what is used for this purpose are:

- either a color code (for example, with 21 tints), the capsules being tinted by coloring in the mass of the polyvinyl chloride;
- or a color code again, but with lines of different tints being marked on the periphery of the capsules;
- or flexible-block printing and conventional ink transfer.

Now a printing technique using a jet of ink recently became known, and it is very useful for this type of application because of

- perfect printing quality,
- excellent retention on the polyvinyl chloride,
- instantaneous drying,
- the possibility of programming any identifying text rapidly,
- the possibility of incrementation, sequential numbering, batch counting, etc.,
- the capacity for dispensing with automatic stopping for any preselected quantity of capsules, with automatic resetting for the following cycle,
- a high printing speed which can reach a rate of 250 characters per second.

This technique of marking without contact with support eliminates the stresses exerted on the block and has the additional advantage of being compatible with the instant-drying flexographic inks specific to polyvinyl chloride.

According to this technique, the ink is forced under pressure through a nozzle which is capable of dividing the ink jet into a stream of tiny ink drops which is broken by ultrasonic vibration.

The drops pass through a charging electrode and receive a variable electrostatic charge. The value of this charge determines the positions of the drops on the support, since they subsequently pass through a constant high-voltage field. This field deflects each ink drop laterally by a distance proportional to the value of its charge.

The characters are formed as a result of the movement of the support perpendicular to the deflection plane. The undeflected ink drops do not contribute to forming the letters. They are thrown directly towards a gutter which collects this ink in order to recycle it.

These mechanisms as a whole are grouped together in a printing head connected to a microprocessor control unit by means of a flexible line.

The object of the invention is to make it possible to carry out an ink-jet printing technique, thereby avoiding the disadvantages of prior printing techniques and affording the advantages listed above.

To achieve this, the invention relates to a dispenser for capsules intended to be printed especially by means of an ink-jet printing machine, with which the said dispenser is associated, the said dispenser being defined in that it comprises a hopper, in which the capsules are placed horizontally and the base of which is formed by a sloping ramp defining, in association with complementary guide means, a dispensing passageway in which the capsules are conveyed by gravity, a member for the unit separation and extraction of the capsules, and members for conveying the capsule to the printing head of the printing machine.

Figure 2:
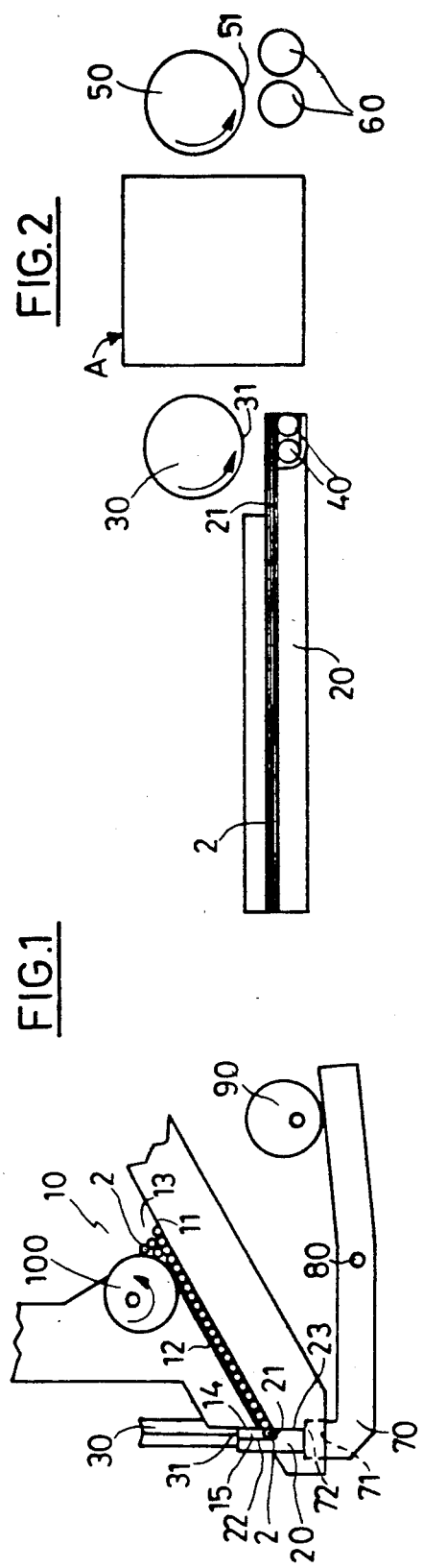
Figure 4:
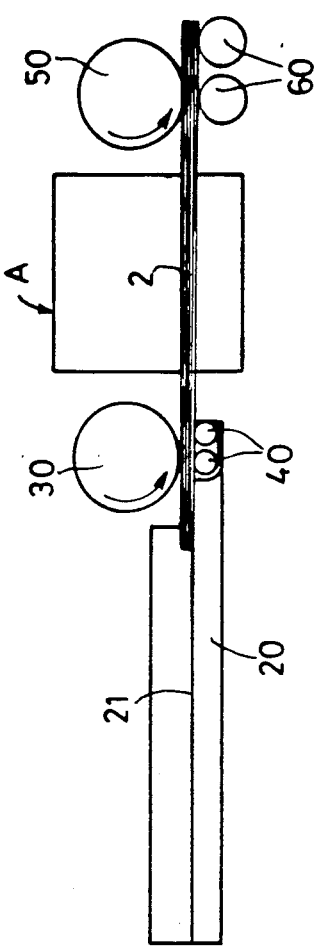
Figure 3:
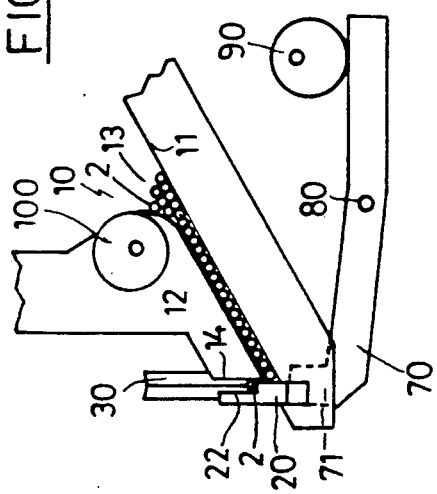

Other features and advantages of the invention will emerge from the following description relating to an embodiment given by way of non-limiting example and illustrated diagrammatically in the accompanying drawings in which:

FIG. 1 is a partial diagrammatic side view of a dispenser according to the invention shown and a capsule, in a first position in which the capsule is not actuated in a longitudinal translational movement towards the printing head of an ink-jet printing unit, FIG. 2 is a diagrammatic view, in the position of FIG. 1, of some of the components of the dispenser and of the printing head of the printing unit, as seen from the front from the location of the feed hopper, the latter being removed, FIG. 3 is a diagrammatic side view of the same dispenser shown and a capsule, in a second position in which the capsule is actuated in a longitudinal translational movement opposite the printing head, FIG. 4 is a diagrammatic view, in the position of FIG. 3, of so me of the components of the dispenser and of the printing head, as seen from the front from the location of the feed hopper, the latter being removed.

The dispenser for cylindrical capsules according to the invention is intended to be arranged in the immediate vicinity of a printing unit equipped with a printing head A (FIGS. 2 and 4).

This dispenser comprises a feed hopper 10 which is intended for the horizontal storage of cylindrical tubular capsules 2 and which has, at its base, a bottom formed by a ramp 11 sloping downwards towards the outside of the hopper, and a ski-shaped front wall, the tip of which is curved towards the outside of the hopper, the lower face 12 of this tip extending parallel to the ramp 11 at a distance from the latter slightly greater than the diameter of the capsules and forming a guide means complementary to the sloping ramp. The sloping ramp 11 and the lower face of the tip define a passageway 13 for conveying the capsules towards the front of the dispenser. This conveying passageway 13 is inclined 30 degrees relative to the horizontal. The conveying passageway 13 for the capsules is limited at the front, that is to say in its lower part, by an L-shaped stop 20 forming a slide for the unit separation and extraction of the capsules, the horizontal base 21 of which has a depth slightly greater than the diameter of the capsules and the vertical face 22 of which is at a distance likewise slightly greater than the diameter of the capsules from the free end of the tip having an opposite vertical face 14; the stop 20 forming a slide is mounted so as to be movable in a vertical translational movement between a low position, in which its horizontal face is an extension of the sloping ramp 11, and a high position, in which its horizontal base is positioned above the lower face 12 of the tip, so that its vertical rear face 23 then closes off the conveying passageway 13; the vertical face 22 of the stop 20 and the veritcal face 14 of the front wall of the hopper thus define a vertical passageway 15 which is intended for separating and extracting one capsule at a time and which extends the conveying passageway 13 upwards at the front.

On one of the sides of the members of the dispenser which have just been described and which constitute means of conveying the capsules in a transverse translational movement are arranged first means of conveying the capsules in a longitudinal translational movement; these first means of conveying in a longitudinal translational movement comprise, on the one hand, a primary driving pulley 30, of which the faces extend parallel to the vertical passageway 15 and of which the mid-plane parallel to the faces is in the extension of the longitudinal mid-plane of the vertical passageway 15; the primary driving pulley, movable in rotation under the action of drive means (not shown), is located at a level above the horizontal base 21 of the L-shaped stop when the latter is in the high position, so that, in the lower part of the pulley, the walls 31 of the groove of the latter are in contact with the capsule resting on this horizontal base 21; the first conveying means comprise, on the other hand, primary contact rollers 40 mounted loosely here and arranged opposite the pulley 30 underneath the latter; these rollers are located at such a distance from the pulley 30 that their upper periphery comes in contact with the capsule on the opposite side to its contact with the pulley; they are embedded in the actual profile of the shoulder of the stop 20 forming the slide equipped with a receptacle receiving the capsule. The ink-jet printing head A is arranged near the means of conveying the capsules in a longitudinal translational movement, on an axis perpendicular to the direction of conveyance of the capsules which is the same as the direction of their longitudinal axis when they are arranged in their unit separation and extraction slide; on the side of the printing head A opposite the side having the first means of conveying the capsules in a longitudinal translational movement are arranged second means of conveying in longitudinal translational movement comprising, on the one hand, a secondary driving pulley 50, of which the walls 51 of the groove in the lower zone are at the same level as those of the primary driving pulley and in the extension of these, and, on the other hand, secondary contact rollers 60, the upper periphery of which comes in contact with the capsule on the opposite side to the contact of the latter with the walls 51 of the groove of the secondary driving pulley 50; as with the first means of conveying in a longitudinal translational movement, the secondary driving pulley 50 is actuated by drive means (not shown), whilst the secondary contact rollers 60 are mounted loosely, this secondary train prolonging the effects of the primary train after the printing head. The vertical translational movement of the stop 20 forming a slide is generated by means of a lever mechanism 70 rocking about an approximately central fixed horizontal axis 80, one of the ends of the lever 70 being held in contact with an eccentric cam 90 offset vertically and located above the rocker lever 70, whilst at the other end of this lever, equipped in its upper part with a finger 71 having a crowned contact surface 72 with a concavity directed upwards, is in contact with the lower face of the stop 20 forming a slide, so that this lower face of the stop 20 rests on the crowned contact surface 72.

According to an advantageous feature of the invention, at the base of the hopper there is another guide means complementary to the sloping ramp, in the form of an eccentric roll 100 equipped with a cam which, in the lower position, leaves at the entrance of the passageway a path which is only very slightly greater than the diameter of a capsule; this eccentric roll 100 is actuated in rotation counter to the direction of advance of the capsules in their transverse translational movement in the conveying passageway 13, in order, by pushing them back upwards, to ensure that badly arranged capsules are aligned in a sheet of a single row on the sloping ramp 11.

Thus, when the capsules are arranged horizontally in the hopper 10, the eccentric roll 100 forms a sheet of capsules of a single row advancing by gravity in a transverse translational movement towards the bottom of the ramp 11 in the conveying passageway 13, the low gravity provided by each capsule generating the appropriate pushing force by accumulation, and a clearance left because the height of the passageway is slightly greater than the diameter of the capsules allowing the latter to be conveyed freely to the stop 20 forming a slide. When this stop 20 is left in the low position by the finger 71 because the opposite end of the rocker lever 70 is then left in the high position by the cam 90, a capsule is introduced onto the horizontal base 21 of the stop; because the point of contact between this capsule and the following one is in the upper half of the former, it is not possible for the latter to engage underneath. When the stop 20 is actuated in an upward vertical translational movement by the finger 71, the opposite end of the rocker lever 70 being pushed downwards by the eccentric cam 90, the capsule is at the same time lifted and separated from the other capsules, and its upper peripheral part comes in contact with the walls 31 of the groove of the primary pulley 30. Since this primary pulley is driven in a continuous rotational movement in the anti-clockwise direction in the drawings, the capsule is driven towards the secondary train, supported by the primary contact rollers 40 which are arranged at the end of the stop 20 on the dispensing side and which, carried by the stop 20, ensure that the capsule is laid against the driving pulley, without opposing the longitudinal translational movement of the capsules. When the capsule passes in front of the printing head A, the ink jet prints the text on this capsule simultaneously, this text having been pre-programmed in the memory of the control unit of the printer, and is reset automatically during the time when each capsule is driven forwards. When a capsule, still travelling in the same conveying direction in a longitudinal translational movement, arrives between the secondary pulley 50 and the secondary rollers 60, it is taken up by these (the secondary pulley 50 rotating in the same direction as the primary pulley 30), in order to discharge it towards the next station in the installation, the following capsule is then conveyed in turn, and so on and so forth, according to the following kinematic cycle:

the primary driving pulley executes four revolutions for one revolution of the eccentric cam 90;

four strokes are controlled or maintained for one resolution of the cam, namely the control of the ascent of the stop 20 to the high position (over 60°), maintaining the stop in the high position during the forward driving of the capsule (over 180°), the control of the descent of the stop to the low position (over 60°), and maintaining the stop in the low position and introducing the following capsule (over 60°).

The time during which the capsule is laid against the driving pulley is equivalent to 180°, that is to say one half-cycle (two revolutions. First, a driving pulley having an effective diameter of 30 millimeters ensures in two revolutions that a capsule 133 millimeters long covers a distance of 188 millimeters, consequently leaving an operating margin of 55 millimeters.

Of course, the invention is not limited to the above-described embodiment illustrated, and other embodiments can be provided without departing from the scope of this invention.

We claim:

1. A dispenser for dispensing and conveying capsules to a printer for receiving indicia comprises a sloping ramp and a complementary guide means which define a conveying passageway having an inlet and an outlet and a vertically movable slide member associated with said outlet and movable between a first position wherein said slide member receives a capsule from said conveying passageway outlet and a second position wherein a portion of said slide member seals said conveying passageway outlet wherein said slide member when in said second position defines with said complementary guide means above said outlet a horizontally extending passageway for conveying the capsule to the printer including drive means associated with said horizontally extending passageway for receiving said capsule when said slide member is in said second position and transporting said capsule to said printer wherein the slide member comprises at least one pair of contact rollers arranged at the end of the slide member which cooperate with said drive means for conveying the capsule.

2. A dispenser according to claim 1 wherein the conveying passageway has a height slightly greater than the diameter of the capsules being conveyed.

3. A dispenser according to claim 1 wherein said slide member is substantially L-shaped in configuration.

4. A dispenser according to claim 1 wherein said slide member is movable by means of a mechanism including a rocker lever actuated by an eccentric cam.

5. A dispenser according to claim 1 wherein the drive means for conveying the capsule comprises a driving pulley.

6. A dispenser according to claim 5 wherein the driving pulley is driven by a drive mechanism in such a way that four revolutions of the said primary driving pulley correspond to one revolution of the eccentric cam, and wherein one revolution of the said cam corresponds to four successive strokes, namely a control of the ascent of the stop to the high position, maintaining the said stop in the high position with the forward driving of the capsule, control of the descent of the said stop to the low position, and maintaining the stop in the low position with the introduction of the following capsule.

7. A dispenser according to claim 1 wherein the printer is arranged on an axis perpendicular to the conveying direction of the capsules.

* * * * *